(No Model.) 2 Sheets—Sheet 1.

F. H. AGNEW.
NUT LOCK.

No. 293,295. Patented Feb. 12, 1884.

Witness.
Harry J. Barker.
Agnew Duff

Inventor.
Franklin Howell Agnew (No Model.) 2 Sheets—Sheet 2.
F. H. AGNEW.
NUT LOCK.
No. 293,295. Patented Feb. 12, 1884.
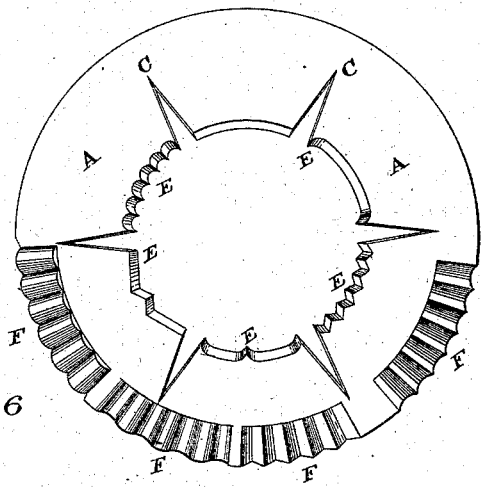
Fig. 6.
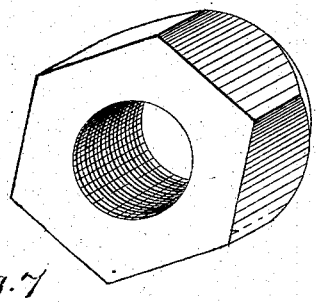
Fig. 7.
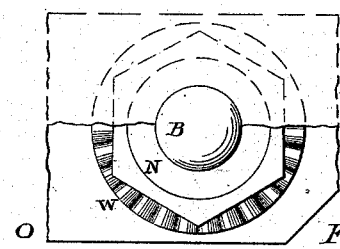
Fig. 8.
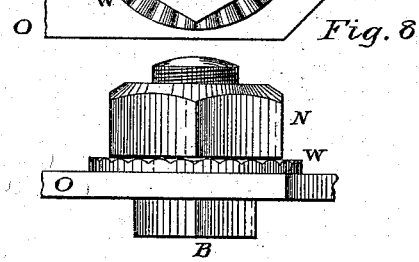
Witness:
Harry T. Barker,
Agnew Duff
Inventor.
Franklin H. Agnew

UNITED STATES PATENT OFFICE.

FRANKLIN HOWELL AGNEW, OF BEAVER, PENNSYLVANIA.

NUT-LOCK.

SPECIFICATION forming part of Letters Patent No. 293,295, dated February 12, 1884.

Application filed April 12, 1882. (No model.)

*To all whom it may concern:*

Be it known that I, FRANKLIN HOWELL AGNEW, a citizen of the United States, residing in the town and county of Beaver, in the State of Pennsylvania, have invented certain new and useful Improvements in Bolts, Nuts, and Washers, of which the following is a specification.

My invention is what is commonly called a "nut-lock," having for its object the prevention of the nut from loosening or falling off the bolt by jarring, shaking, &c.

It consists in the main of a slotted and dished washer operated somewhat after the manner of the toggle-joint, so that it is made to pinch, and is bound fast to the bolt. Thus prevented from turning, it holds the nut by means of friction.

Figure 1:
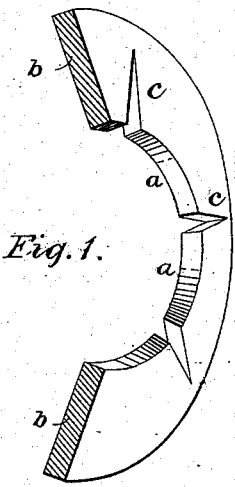
Figure 2:
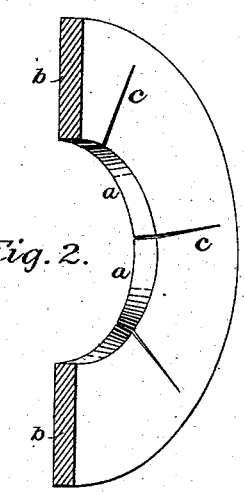
Figure 4:
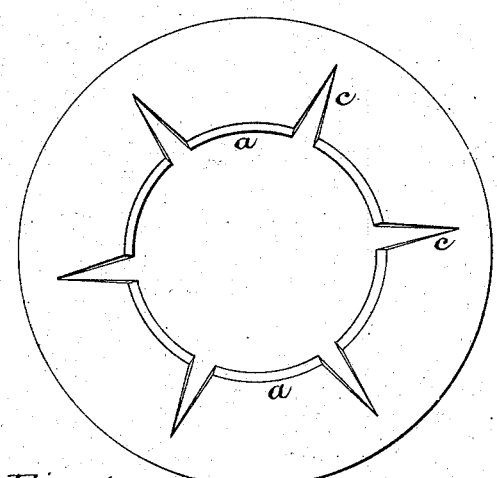
Figure 3:
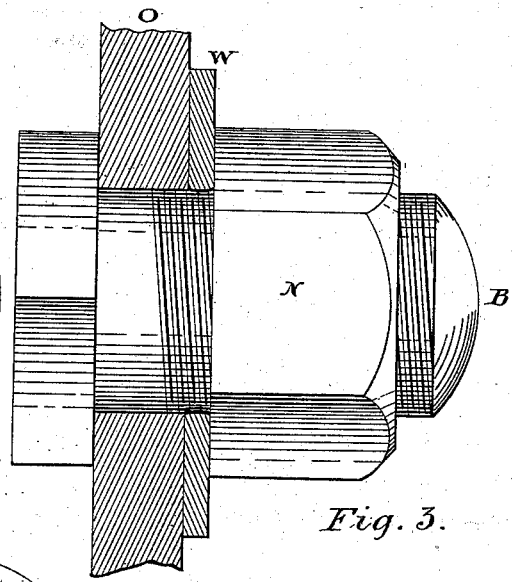

This improved washer is illustrated in the accompanying drawings, in which Figure 1 is a view of half of washer, showing the section made by a cut through the center and lengthwise with the bolt. Fig. 2 is the same, but flattened, as when in position. Fig. 3 is a side view of washer, nut, &c., when in position fastening some object. Fig. 4 is a face view of washer, and Figs. 5, 6, 7, and 8 show certain additional features and modifications of my invention.

The construction of these washers is very simple, and differs in the combination of three principal features from the ordinary washer—viz., first, in being of a dished or concave form, which is shown by Fig. 1, the section *b b* indicating this distinctly; second, in having slits *c c*, &c., from the inner or central portion of the washer outward, but not entirely through, leaving the rim solid; and, third, in having the hole of the washer less than the diameter of the bolt when the washer is in the flattened condition, as shown in Figs. 2 and 3. Of course, when the washer is dished or concave, as shown in Figs. 1 and 4, the hole will be larger than when it is flat, and it must be sufficiently large when thus dished or concave to go on the bolt. The effect of this mode of construction is obvious. When the nut is screwed up, the washer is caught between the nut and object fastened, and is squeezed into a flattened shape, as illustrated in Fig. 2, and more clearly shown in Fig. 3, where B is the bolt, W the washer, N the nut, and O the object fastened. The slits *c c* enable the washer more readily to assume a flattened shape, and this is their purpose; but when the washer is thus flattened, and since its inside diameter or hole in this condition is less than the diameter of the bolt, it will be contracted around and become bound fast to the bolt, for it is plain that as the nut is screwed up and the washer thereby assumes a flatter and flatter shape the opposite inner portions of the washer *a a*, Fig. 4, will come nearer and nearer together, and upon the principle of the toggle-joint will at last pinch and clamp the bolt with great force. The washer is thus held fast to the bolt, and the friction between the washer and nut will be sufficient to hold it and prevent it (the nut) from turning by shaking, jarring, &c.

In order to increase the hold of the washer upon the bolt and of the nut upon the washer, the surfaces of the washer which come in contact with the bolt and with the nut are roughened by raised points, lines, knobs, or edges of any shape. The best mode of doing this is with longitudinal and radial edges, as shown in Fig. 6. There the inner portion of the washer which comes against the bolt is furnished with raised edges or teeth longitudinal—that is, in a direction lengthwise with the bolt—and with radial flutings or edges on the face of the washer. These teeth are shown at E E, &c., and the flutings at F F, &c. The teeth E E, &c., bite into the edges of the thread on the bolt, and thus securely hold the washer and prevent it from turning, while the points of the nut falling into the flutings F F, &c., the nut cannot be shaken or jarred loose.

Fig. 8 in two parts corresponds to Fig. 3, showing the whole when fastening some object, but the washer being like that shown in Fig. 6.

Figure 5:
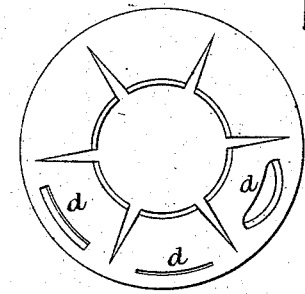

Other modifications of my invention may be made, as holes, cuts, indentations, or depressions, *d d*, &c., Fig. 5. These will facilitate bringing the washer into a flattened shape; but generally they are not necessary, as the slits *c c*, &c., are usually sufficient. It may be observed further that the thickness of these washers is best equal to or more than the distance between the threads of the bolt, and while they may be of any material steel and iron are best.

The operation of putting on this improved washer is obviously the same as usual, only it may be requiring more force and to be put on and off by means of a wrench. It admits also, as is obvious, of the nut being turned up a little more from time to time, as occasion may demand. This facility of use and simplicity of construction make this improvement a cheap, simple, and important one, it is believed.

What I claim as my improvement, and desire to secure by Letters Patent, is—

The combination, with a nut and bolt, of a washer having a dished or concave inner portion, partial slits $c\ c$, a hole less, when the washer is flattened, than the diameter of the bolt, and with plane or roughened surfaces to come in contact with the bolt and nut, and with or without the cuts or indentations $d\ d$, all substantially as set forth.

Witnesss my hand this 8th day of April, A. D. 1882.

FRANKLIN HOWELL AGNEW.

Attest:
HARRY T. BARKER,
AGNEW DUFF.